US010082760B2

United States Patent
Bodinger et al.

(10) Patent No.: US 10,082,760 B2
(45) Date of Patent: Sep. 25, 2018

(54) PRINTING SYSTEM AND METHOD (71) Applicant: Hewlett-Packard Indigo, B.V., Amstelveen (NL)

(72) Inventors: Eyal Bodinger, Ness Ziona (IL); Itzik Shaul, Ness Ziona (IL); George Trendafilov, Ness Ziona (IL); Gilad Greenberg, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 14/653,715

(22) PCT Filed: Dec. 21, 2012

(86) PCT No.: PCT/EP2012/076638
§ 371 (c)(1),
(2) Date: Jun. 18, 2015

(87) PCT Pub. No.: WO2014/094872
PCT Pub. Date: Jun. 26, 2014

(65) Prior Publication Data
US 2015/0331379 A1    Nov. 19, 2015

(51) Int. Cl.
*G03G 15/00* (2006.01)
*B41M 3/00* (2006.01)
*B41J 11/00* (2006.01)
*H04N 1/54* (2006.01)

(52) U.S. Cl.
CPC ........ *G03G 15/6585* (2013.01); *B41J 11/009* (2013.01); *B41M 3/00* (2013.01); *H04N 1/54* (2013.01); *Y10T 428/24802* (2015.01)

(58) Field of Classification Search
CPC ..................................................... B41J 2/0057
See application file for complete search history.

(56) References Cited

U.S. PATENT DOCUMENTS

| 6,180,219 | B1 | 1/2001 | Hoshino et al. |
| 6,511,736 | B1 | 1/2003 | Asano et al. |
| 6,916,583 | B1 | 7/2005 | Landa et al. |
| 7,400,850 | B2 * | 7/2008 | Romem ............... G03G 15/161 399/296 |
| 8,195,077 | B2 | 6/2012 | Moteki |
| 2005/0058955 | A1 * | 3/2005 | Kusunoki .............. G03B 21/18 430/348 |

(Continued)

FOREIGN PATENT DOCUMENTS

| CN | 102381024 | 3/2012 |
| CN | 102653181 | 9/2012 |

(Continued)

OTHER PUBLICATIONS

"Digital Offset Color", Indigo Technology, p. 1-11. http://www.colorline-usa.com/Digital_Offset_color.pdf.

(Continued)

*Primary Examiner* — Shelby Fidler
(74) *Attorney, Agent, or Firm* — HP Inc. Patent Department (57) ABSTRACT

According to one example, there is provided a method of printing. The method comprises generating a gloss modification image based on a substrate gloss level and a desired gloss level for a portion of the image, and printing the image and the gloss modification image on the substrate.

12 Claims, 6 Drawing Sheets

(56) References Cited

U.S. PATENT DOCUMENTS

| | | | |
|---|---|---|---|
| 2005/0219294 A1* | 10/2005 | Nakazawa | G06K 15/107 347/14 |
| 2007/0105034 A1* | 5/2007 | Chatow | G03G 9/12 430/114 |
| 2008/0266346 A1* | 10/2008 | Naivelt | B41J 11/0005 347/16 |
| 2008/0266371 A1* | 10/2008 | Ma | B41J 11/0015 347/96 |
| 2011/0116111 A1 | 5/2011 | Harada | |
| 2012/0050365 A1 | 3/2012 | Konno et al. | |
| 2012/0139984 A1* | 6/2012 | Lang | B41J 2/1755 347/15 |
| 2012/0223982 A1 | 9/2012 | Kondo et al. | |
| 2017/0013172 A1* | 1/2017 | Shibasaki | H04N 1/54 |

FOREIGN PATENT DOCUMENTS

| | | |
|---|---|---|
| JP | 2006-171306 | 6/2006 |
| JP | 2010-175969 | 8/2010 |
| JP | 2010-271546 | 12/2010 |
| JP | 2012-212126 | 11/2012 |
| WO | WO-2012/026394 | 3/2012 |
| WO | WO-2012/082269 | 6/2012 |

OTHER PUBLICATIONS

International Search Report and Written Opinion dated Feb. 7, 2013, issued on PCT Patent Application No. PCT/EP2012/076638 dated Dec. 21, 2012, European Patent Office.

\* cited by examiner

PRINTING SYSTEM AND METHOD

CLAIM FOR PRIORITY

The present application is a national stage filing under 35 U.S.C 371 of PCT application number PCT/EP2012/076638, having an international filing date of Dec. 21, 2012, the disclosure of which is hereby incorporated by reference in its entirety.

BACKGROUND

Modern digital printing systems are capable of producing high quality printed images on a wide-range of substrates. However, in addition to the quality of the printed image, the level of glossiness (hereinafter referred to as gloss level) of the printed image is important from an aesthetic aspect.

The gloss level of a printed image is largely determined by the surface properties of the substrate on which an image is printed and the properties of the ink used. Substrates usually have a substantially uniform gloss level across their surface. Varnish may also be applied to change the gloss level of a printed image or a portion thereof.

BRIEF DESCRIPTION

Examples, or embodiments, of the invention will now be described, by way of non-limiting example only, with reference to the accompanying drawings, in which.

DETAILED DESCRIPTION

As already mentioned, the gloss level of a printed image is determined largely by the surface properties of the substrate on which an image is printed and the properties of the ink used. For water-based inkjet printing and liquid electro-photographic (LEP) printing systems images printed on glossy substrates will have a glossy appearance, and images printed on matte substrates will have a matte appearance. Images printed using xerography techniques, however, substantially modify the substrate surface properties making the gloss level of such images less dependent on the type of substrate.

Figure 12A:
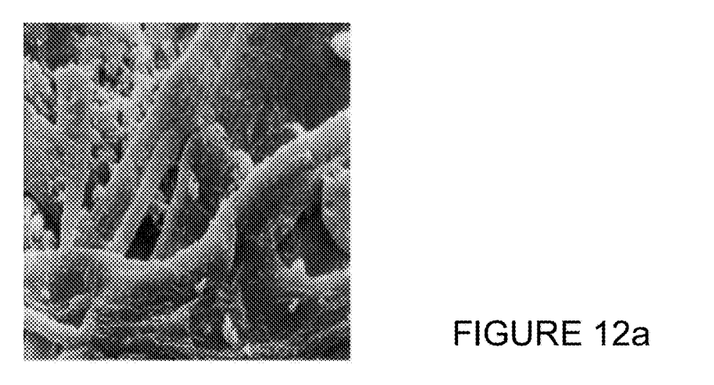
FIGS. 12a-c show a series of photographs that demonstrate the effect of printing an image on a paper substrate using both a liquid electro-photographic printing system and a xerographic printing system.
Figure 12B:
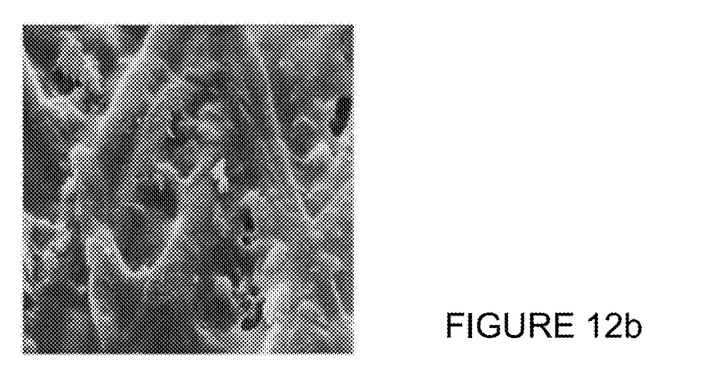
Figure 12C:
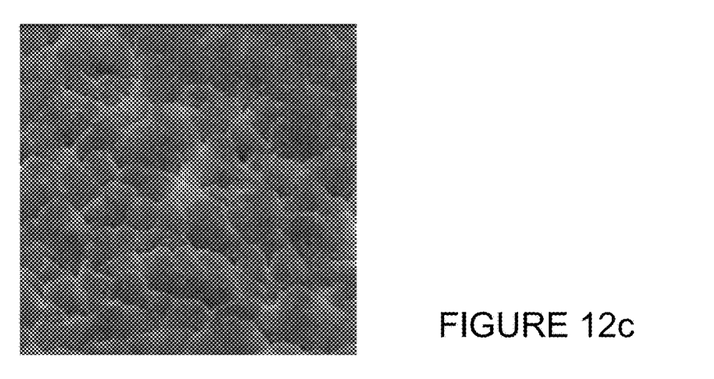

FIGS. 12a-c shows a series of photographs that demonstrate the effect of printing an image on a paper substrate using both an LEP printing system and a xerographic printing system.

FIG. 12a shows a microscopic level image of a typical plain office paper substrate.

FIG. 12b shows a microscopic level image of an LEP image printed on such a substrate. As can be seen, the surface characteristics of the printed image do not dramatically modification the surface properties of the substrate.

FIG. 12c shows a microscopic level image of a xerographic printed image printed on the same type of substrate. As can be seen the xerographic image dramatically modifies the surface properties of the substrate.

An image, or a portion thereof, printed on a matte substrate may have its gloss level modified by applying a varnish layer. However, such printing systems require the use of additional printheads or varnish applicators to apply a solid layer of varnish.

The gloss level of a varnished area is largely determined by the characteristics of the varnish and the surface characteristics of the substrate. Accordingly, such systems are not able to produce varying gloss levels within a single printed image. Furthermore, such systems do not allow for a gloss level of portion of a printed image to be specified, and do not allow a desired variable gloss level to be achieved.

There is, however, significant value, both aesthetically and commercially, in being able to select, prior to printing an image, a desired gloss level for a portion of the image, and producing a printed image at least a portion of which has the desired gloss level.

Examples described herein provide a printing system and a method of operating a printing system that enables a printed image to be produced such that a portion of a printed image has a desired gloss level. Furthermore, the desired gloss level may be higher or lower than the gloss level of the substrate on which the image is printed and may also be higher or lower than other portions of the printed image.

Figure 1:
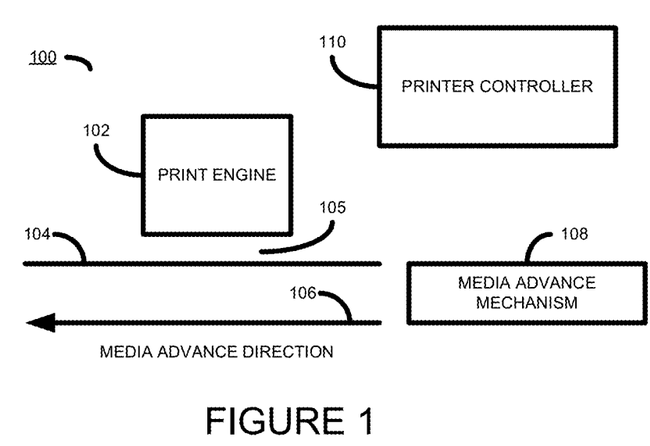
FIG. 1 is a simplified illustration of a printing system according to one example.

Referring now to FIG. 1, there is shown a simplified illustration of a printing system 100 according to one example. The printing system 100 comprises a print engine 102 for printing on a substrate, such as a substrate 104. The substrate 104 is advanced through a print zone 105 of the print engine 102 by a substrate advance mechanism 108. The operation of the printing system 100 is generally controlled by a printer controller 110.

Figure 2:
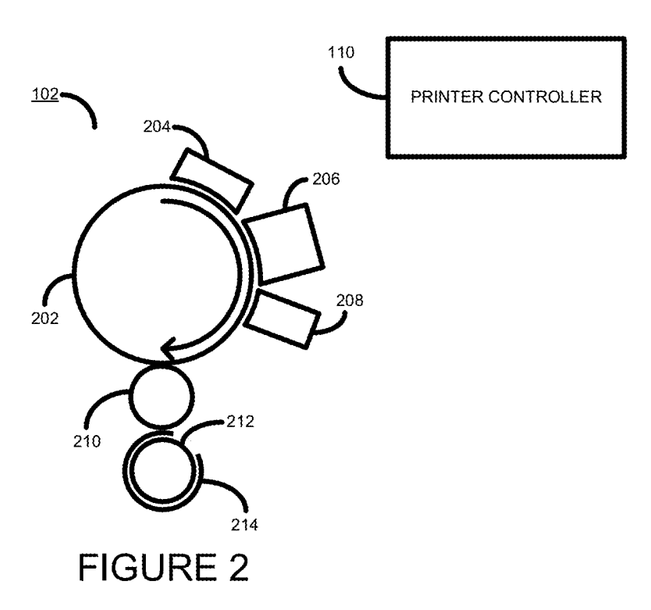
FIG. 2 is a simplified illustration of a liquid electro-photographic printing system according to one example.

In one example the print engine 102 is a liquid electro-photographic (LEP) print engine, an example of which is shown in greater detail in FIG. 2.

In this example the print engine 102 comprises a rotatable photoconductor drum 202 on which an electrical charge is developed by a charging module 204, as the drum 202 rotates. A light imaging module 206 selectively shines light, such as laser light, on different portions of the drum 202 to selectively dissipate electrical charges in accordance with an image, or an image separation, to be printed. In this way a latent image is produced on the photoconductor drum 202 comprising charged and non-charged regions. The latent image is developed by a binary image developer (BID) 208 which provides liquid ink, such as Hewlett-Packard's ElectroInk, in proximity to the surface of the drum 202 such that ink from the BID 208 is electrostatically transferred to the surface of the drum 202 in accordance with the latent image produced thereon.

The ink developed on the drum 202 is electrostatically transferred to a heated intermediate transfer member (ITM) 210. In one example the ITM 210 may be heated to around 100 degrees Celsius. Carrier liquid of the transferred image is evaporated leaving an image film having a high percentage of ink solids on the ITM 210. The image film is then transferred to a substrate 214 positioned on an impression roller 212 through the application of pressure between the impression roller 212 and the ITM 210.

Typically an LEP image printed in this way has a thickness in the order of about 2 to 10 microns.

In full colour printing, multiple images are each developed using a different colour ink (such as a cyan ink, a yellow ink, a magenta ink, and black ink), and may be generated and transferred separately to a substrate to produce a full colour image. In other examples multiple colour image separations may be generated on the ITM 210 and transferred in a single transfer step to a substrate 214.

The thinness of an LEP image film created on the ITM 210 is such that when the image film is transferred to a substrate the image film substantially follows the surface profile of the substrate. In this way, the gloss level of the printed image substantially matches the gloss level of the substrate, as is illustrated in FIG. 3.

Figure 3A:
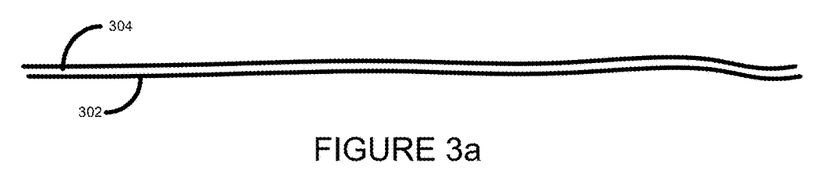
FIG. 3a illustrates a magnified cross section view of a portion of a substrate.

FIG. 3a illustrates a magnified cross section view of a portion of a substrate 302. The upper surface of the substrate 302 has a high degree of surface smoothness which gives the substrate 302 a glossy appearance. A layer of LEP image film 304 printed on the upper surface of the substrate 302 closely follows the surface profile of the substrate, and hence the printed image 304 also exhibits glossy finish.

Figure 3B:
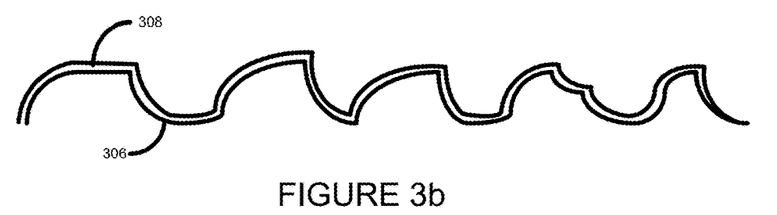
FIG. 3b illustrates a magnified cross section view of a portion of a substrate.

FIG. 3b illustrates a magnified cross section view of a substrate 306. The upper surface of the substrate 306 has a degree of unevenness or roughness which gives the substrate 302 a matte appearance. A layer of LEP image film 308 printed on the upper surface of the substrate 306 closely follows the surface profile of the substrate, and hence the printed image 308 exhibits a matte finish.

Figure 4:
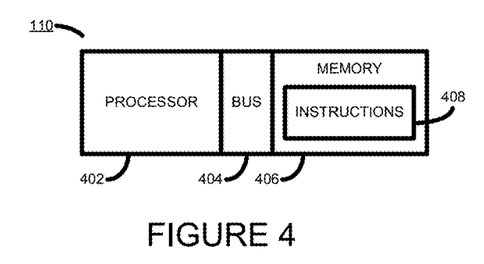
FIG. 4 is a simplified block diagram of a printer controller according to one example.
Figure 6:
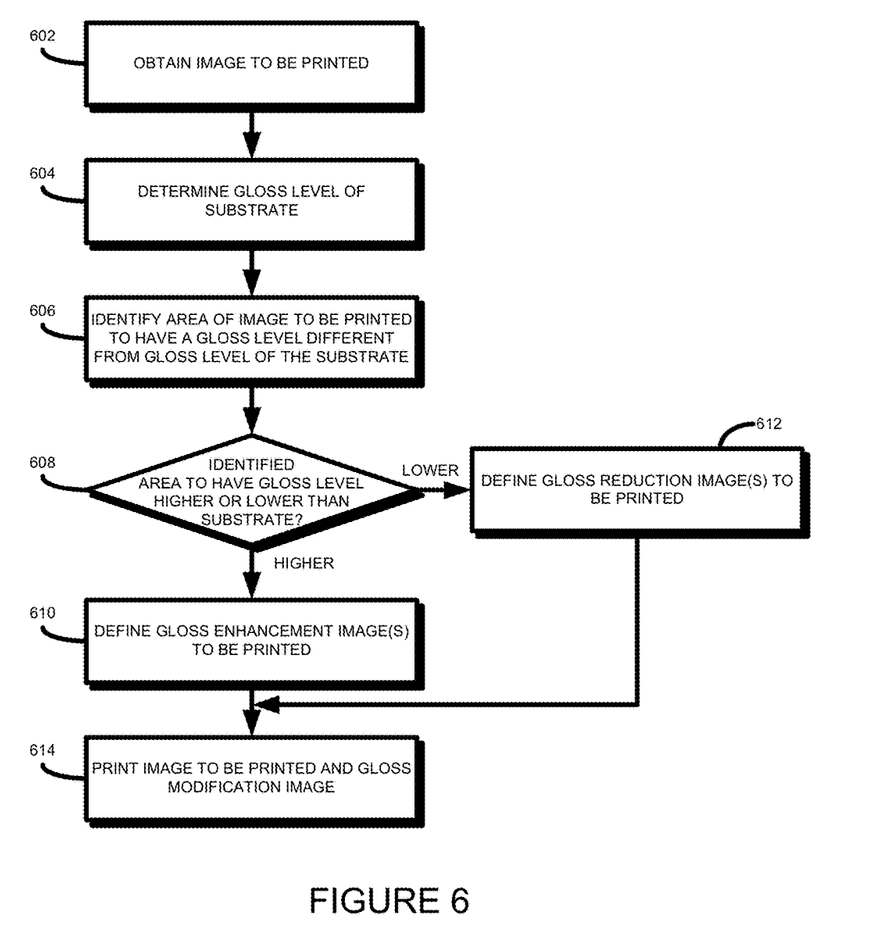
FIG. 6 is a flow diagram outlining a method of operating a printing system according to one example.
Figure 10:
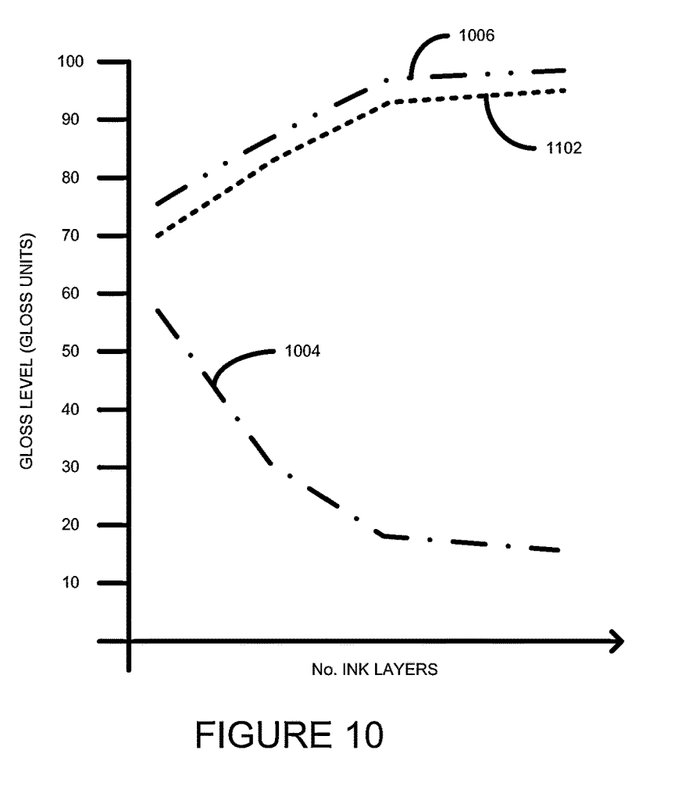
FIG. 10 shows a graph illustrating the relationship between the gloss level of a printed image portion and the number of gloss enhancement and reduction images used according to one example.

As previously described, the printing system 100 is generally controlled by a printer controller 110 which is shown in more detail in FIG. 4. The controller 110 comprises a processor 402 such as a microprocessor, a microcontroller, a computer processor, or the like. The processor 402 is in communication with a memory 406 via a communication bus 404. The memory 406 stores computer understandable instructions 408 that, when executed by the processor 402 cause the controller 110 to operate the printing system 100 in accordance with the methods described below and as illustrated in FIGS. 6 and 10.

An example of operating a printing system to generate a printed image having a portion that has desired gloss level that is different from the gloss level of the substrate on which the image is printed is described below with additional reference to FIG. 5.

At block 602 (FIG. 6) the controller 110 obtains an image to be printed. The image to be printed is defined in a suitable digital form, for example in a print job file. The print job file may be suitably generated by a raster image processor (RIP), a graphic design computer application, a computer printer driver, or other appropriate means.

Figure 5:
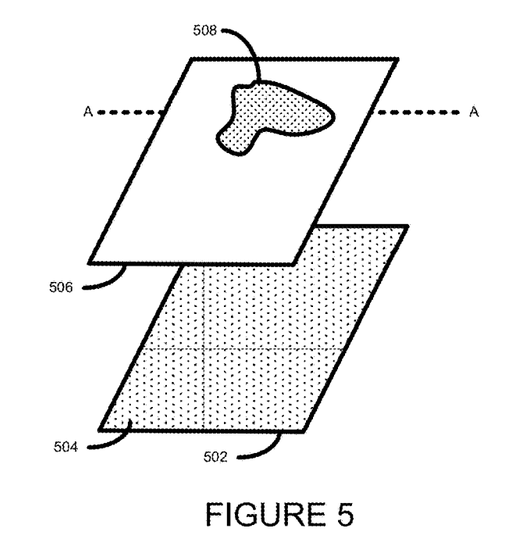
FIG. 5 illustrates an image to be printed according to one example.

As shown in FIG. 5, first image layer 502 is defined that describes an image to be printed 504. The image 504 includes a portion that is to be printed such it has a desired gloss level when printed.

The portion of the image that is to be printed to have a desired gloss level is defined in a second image layer 506, which defines a portion 508 to have a desired gloss level. In one example the portion 508 may correspond to the whole of the image to be printed 504. In one example the desired gloss level of the portion 508 is defined in gloss units.

It should be noted that the defined gloss level of the portion 508 is an absolute gloss level, and is not dependent on the gloss level of the substrate on which the image is to be printed.

At block 604 the controller 110 determines the gloss level of a substrate on which the obtained image is to be printed. In one example the gloss level of the substrate is obtained from a user through a user interface (not shown) provided on the printing system 100. In another example the gloss level of the substrate is determined from a glossmeter (not shown) which is appropriately positioned in the substrate path of the printing system. In another example the gloss level of the substrate is determined by reading, using a suitable imaging device, a computer readable code, such as a barcode, printed on the substrate.

At block 606 the controller 110 determines, from the image layer 506, the desired gloss level of the portion 508 of the image to be printed 504.

At block 608 the controller 110 determines whether the desired gloss level of the portion 508 is higher or lower than the determined gloss level of the substrate.

If the controller 110 determines that the desired gloss level of the portion 508 is higher than the determined gloss level of the substrate, the controller 110 generates (610) one or multiple gloss enhancement images to be printed corresponding to the portion 508. Details of the gloss enhancement image(s) are given further below.

If the controller 110 determines that the desired gloss level of the portion 508 is lower than the determined gloss level of the substrate, the controller 110 generates (612) one or multiple gloss reduction images to be printed corresponding to the portion 508. Details of the gloss reduction image(s) are given further below.

At block 614 the controller 110 controls the printing system 100 to print the obtained image to be printed and to print the generated gloss enhancement or gloss reduction image or images. In this way, the area of the printed image defined to have a desired gloss level exhibits the, or substantially the, desired gloss level.

In one example the gloss enhancement and reduction images are images to be printed on top of (i.e. are printed after) the portion 508. In another example the gloss enhancement and reduction images are printed beneath (i.e. are printed before) the portion 508.

If the gloss level of the portion 508 is determined to be higher than the gloss level of the substrate the controller 110 generates one or multiple gloss enhancement images to be printed. In one example each gloss enhancement image is a copy of the portion of the image to be printed 504 that corresponds to the portion 508. In other words, the portion of the image to be printed 504 that is to have a higher gloss level than the substrate will be overprinted, with the same image content, one or multiple times.

In another example each gloss enhancement image may be defined to be printed in a transparent ink or varnish. In one example each gloss enhancement image is a solid fill image.

Figure 7:
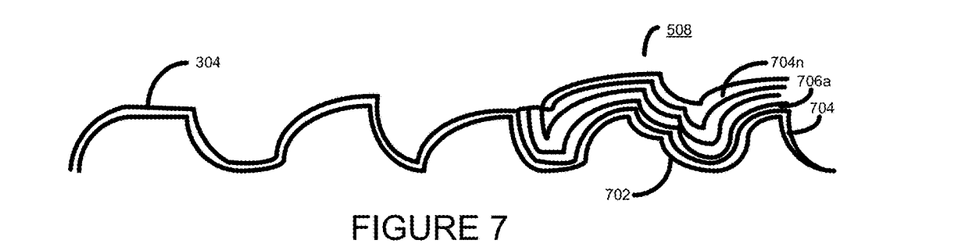
FIG. 7 illustrates a magnified cross section view of a portion of a substrate of which the gloss level of a portion of a printed image has been increased according to one example.

The effect of printing one or multiple additional image layers is illustrated in FIG. 7. FIG. 7 illustrates a magnified cross section view of a substrate 702 the upper surface of which has a degree of unevenness or roughness which gives the substrate 702 a surface having a low gloss level. In the portion 508 multiple gloss enhancement images (706a to 706n) have been overprinted on the printed image 704. As shown, each successive gloss enhancement image 704 that is printed reduces the surface roughness, and hence increases the gloss level of the portion 508 to the, or to substantially the, desired gloss level defined for the portion 508.

The relationship between the gloss level of a printed image and the number of gloss enhancement images printed can be determined through testing, for example taking into account factors including: ink characteristics; initial substrate gloss level; substrate type; and so on. FIG. 10 shows a graph illustrating (line 1002) the relationship between the number of gloss enhancement images printed and the gloss level of the image portion 508, for a given ink and a given substrate. In one example the number of gloss enhancement images may be in the range of about 1 to 50, depending on the desired gloss level to be achieved. In other examples, however, a greater number of gloss enhancement images may be useful.

As can be seen, as additional gloss enhancement images are printed, the gloss level of the gloss enhanced region increases. In the example shown, at a certain point the rate of improvement in gloss level reduces as the number of additional gloss enhancement layers are printed.

This data may be stored, for example, in a lookup table in a memory or other storage media, and used by the controller 110 to determine the number of gloss enhancement images to be printed given the desired gloss level of the image portion 508 and the gloss level of the substrate on which the image is to be printed.

If the gloss level of the portion 508 is determined to be lower than the gloss level of the substrate the controller 110 generates one or multiple gloss reduction images to be printed. In one example each gloss reduction image is a modified copy of the portion of the image to be printed 504 that corresponds to the portion 508. In other words, the portion of the image to be printed 504 that is to have a lower gloss level than the substrate will be overprinted with the modified image content one or multiple times.

In one example the modified image content is obtained by masking the area to be overprinted with a gloss reduction mask or pattern, as described below. In another example each gloss reduction image may be based on the gloss reduction mask.

Figure 8:
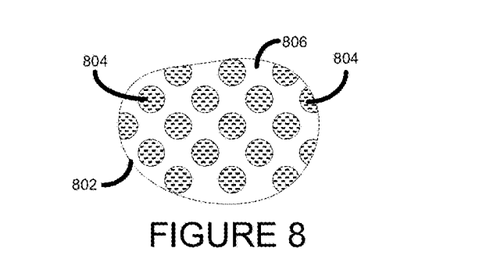
FIG. 8 illustrates a gloss reduction pattern according to one example.

An example gloss reduction pattern or mask 802 is illustrated in FIG. 8. The gloss reduction pattern 802 comprises a pattern of printing fluid marks, or dots, to be printed 804. The pattern of marks is arranged such that when printed the gloss level of the printed gloss reduction image is lower than the gloss level of the image on which the gloss reduction image is printed.

In this example the dots to be printed 804 are arranged in a regular pattern, and each dot to be printed 804 is surrounded by an area not to be printed 806. The density of the pattern of dots to be printed may be varied, but in some examples be in the range of about 30 to 80% density (where 100% density is a solid fill area). In other examples other gloss reduction patterns may be used, such as patterns having a non-regular arrangement of dots to be printed 804. In other examples patterns other than round dots may be used, for example rectangular or oval dots.

Figure 9:
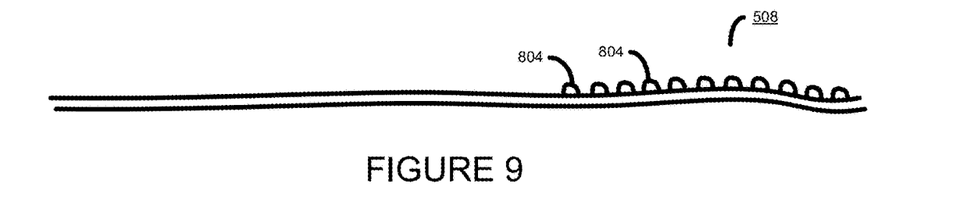
FIG. 9 illustrates a magnified cross section view of a portion of a substrate of which the gloss level of a portion of a printed image has been reduced according to one example.

The effect of printing a gloss reduction pattern 802 on a glossy substrate is illustrated in FIG. 9. The gloss reduction pattern increases the surface roughness which reduces specular reflection of light, and hence reduces the gloss level of the area printed with the gloss reduction pattern 802.

Overprinting a gloss reduction pattern 802 multiple times further increases surface roughness and further reduces the gloss level of the area printed.

The relationship between the gloss level of a printed image and the number of gloss reduction images printed can be determined through testing, for example taking factors including: ink characteristics; initial substrate gloss level; substrate type; and so on. FIG. 10 shows a graph illustrating (line 1004) the relationship between the number of gloss reduction images printed and the gloss level of the gloss reduced portion, for a given ink and a given substrate.

As can be seen, as additional gloss reduction images are printed, the gloss level of the gloss enhanced region increases. In the example shown, at a certain point the rate of decrease in gloss level reduces as the number of additional gloss reduction layers are printed.

This data may be stored, for example, in a lookup table in a memory or other storage media, and used by the controller 110 to determine the number of gloss reduction images to be printed given the desired gloss level of the image portion 508 and the gloss level of the substrate on which the image is to be printed.

The gloss enhancement and gloss reduction images are referred to herein as gloss modification images.

In a further example, further improvements in the level of gloss enhancement can be achieved by increasing the length of time between an image and associated gloss enhancement image or image being printed and the ink becoming set. For example, in an LEP printing system the ink setting time may be increased by keeping the ink above a predetermined temperature after transfer of the printed image from the ITM 210 (FIG. 2) to the substrate 214 has occurred. In a printing system using UV curable inks, the ink setting time may be increased by delaying complete curing of a portion of the image corresponding to a gloss enhancement image. In both cases, increasing the ink setting time allows the ink to more fully settle, and have less surface roughness, before becoming set.

Figure 11:
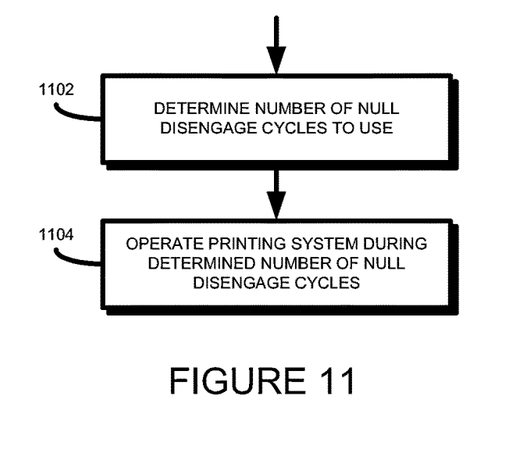
FIG. 11 is a flow diagram outlining a method of operating a printing system according to one example.

Advantageously, in an LEP printing system such as the HP Indigo range of digital presses, the ink setting time may be increased by operating the printing system in accordance with the additional method steps outlined in the flow diagram of FIG. 11, and without requiring any hardware modifications.

At block 1102 the controller 110 determines, in addition to the gloss enhancement image(s) to be printed, an increase in the ink setting time after the image to be printed and one or multiple gloss enhancement images have been printed. In a HP Indigo type digital press, an increase in the ink setting time may be achieved by making use of so-called null disengage cycles. A null disengage cycle is where the impression roller 212 is mechanically disengaged, or distanced, from ITM (210) such that as the impression roller 212 rotates no contact is made between substrate 214 held on the impression roller 212 and the ITM 210. During a null disengage cycle, no image is developed on the photoconductor drum 202, and hence no image is transferred to the ITM 210. However, the ITM 210 is maintained hot, and the distance between the ITM 210 and the impression roller 212 is small enough that ink previously transferred on to a substrate held on the impression roller remains heated by the ITM 210.

By performing one or multiple null disengage cycles in this way allows the ink setting time of the ink printed on the substrate 212 to be increased, hence further increasing the overall gloss level of the printed image.

As before, testing will indicate the relationship between the number of null disengage cycles used and the level of gloss enhancement for particular ink and substrate combinations. An example of the increase in gloss level based on a number of null disengage cycles is shown as line 1006 in FIG. 10. Again, this data may be stored in a suitable memory or lookup table, thus allowing the controller 110 to determine a number of gloss enhancement images to be printed and a number of zero or more null disengage cycles to be used in combination to generate a printed image with a portion thereof having a desired gloss level.

At block 1104, the controller 110 controls the printer to perform the determined number of null disengage cycles.

In printing systems that use UV curable ink the controller 110 may controller a UV curing module to use a combination of gloss enhancement images and the delaying of the curing of the whole or a portion of a printed image to produce a printed image having the desired gloss level.

Although the examples above have been described primarily with reference to LEP printing systems, it will be appreciated that the techniques described herein may be applied to other printing system that generate a printed image that forms a distinct ink layer on top of a substrate surface. Examples of such printing technology include liquid electro-photographic (LEP) printing technology, and inkjet ultra-violet (UV) curable printing technology. Other printing technology, such as aqueous inkjet printing technology, in which ink is absorbed into a porous substrate surface and hence does not form a distinct ink layer on top of a substrate, are not considered suitable types of print engine.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:
a controller to:
   obtain an image to be printed;
   determine a gloss level of a substrate on which the image is to be printed;
   obtain data defining a first area of the image to be printed with a desired gloss level different from the gloss level of the substrate;
   based on a determination of whether the gloss level of the substrate is higher or lower than the desired gloss level of the area, generate a gloss modification image of the first area, wherein the gloss modification image is a gloss enhancement image of the first area if the desired gloss level is higher than the gloss level of the substrate, or a gloss reduction image of the first area if the desired gloss level is lower than the gloss level of the substrate;
   based on the desired gloss level of the first area and the gloss level of the substrate, determine a total number of gloss modification images to print on top of the first area of the image to achieve the desired gloss level for the first area; and
   control the printing system to print the image on the substrate and, after the image is printed, print the determined total number of gloss modification images on top the first area of the printed image such that the first area of the image when printed has substantially the desired gloss level.

2. The printing system of claim 1, wherein the printing system is a liquid electro-photographic printing system, and wherein each gloss modification image is printed as a film of LEP ink.

3. The printing system of claim 2, wherein the controller is further to increase an ink setting time of the printed gloss enhancement image by using one or multiple null disengage cycles.

4. The printing system of claim 1, wherein the controller is further to generate the gloss reduction image defining a pre-determined pattern of ink marks to be printed, the pattern defined to reduce the gloss level of the image on which the ink marks are printed.

5. A processor-implemented method of printing comprising:
   obtaining, by a processor, an image to be printed;
   determining, by the processor, a gloss level of a substrate on which the image is to be printed;
   obtaining, by the processor, data defining a first area of the image to be printed with a desired gloss level different from the gloss level of the substrate;
   based on a determination of whether the gloss level of the substrate is higher or lower than the desired gloss level of the area, generating, by the processor, a gloss modification image of the first area, wherein the gloss modification image is a gloss enhancement image of the first area if the desired gloss level is higher than the gloss level of the substrate, or a gloss reduction image of the first area if the desired gloss level is lower than the gloss level of the substrate;
   based on the desired gloss level of the first area and the gloss level of the substrate, determining, by the processor, a total number of gloss modification images to print on top of the first area of the image to achieve the desired gloss level for the first area; and
   controlling, by the processor, a printing system to print the image on the substrate and, after the image is printed, print the determined total number of gloss modification images on top the first area of the printed image such that the first area of the image when printed has substantially the desired gloss level.

6. The method of claim 5, wherein the printing system is a liquid electro-photographic printing system, and wherein each gloss modification image is printed as a film of LEP ink.

7. The method of claim 5, further comprising: generating the gloss reduction image to define a pre-determined pattern of ink marks to be printed, the pre-determined pattern defined to reduce the gloss level of the image on which the ink marks are printed.

8. The method of claim 5, further comprising: increasing an ink setting time of the printed gloss enhancement image by using one or multiple null disengage cycles.

9. A non-transitory computer readable storage medium storing instructions that when executed by a processor of a printing system cause the processor to:
 obtain an image to be printed;
 determine a gloss level of a substrate on which the image is to be printed;
 obtain data defining a first area of the image to be printed with a desired gloss level different from the gloss level of the substrate;
 based on a determination of whether the gloss level of the substrate is higher or lower than the desired gloss level of the area, generate a gloss modification image of the first area, wherein the gloss modification image is a gloss enhancement image of the first area if the desired gloss level is higher than the gloss level of the substrate, or a gloss reduction image of the first area if the desired gloss level is lower than the gloss level of the substrate;
 based on the desired gloss level of the first area and the gloss level of the substrate, determine a total number of gloss modification images to print on top of the first area of the image to achieve the desired gloss level for the first area; and
 control the printing system to print the image on the substrate and, after the image is printed, print the determined total number of gloss modification images on top the first area of the printed image such that the first area of the image when printed has substantially the desired gloss level.

10. The non-transitory computer readable storage medium of claim 9, wherein the printing system is a liquid electro-photographic printing system, and wherein each gloss modification image is printed as a film of LEP ink.

11. The non-transitory computer readable storage medium of claim 9, wherein the processor is further to generate the gloss reduction image to define a pre-determined pattern of ink marks to be printed, the pattern defined to reduce the gloss level of the image on which the ink marks are printed.

12. The non-transitory computer readable storage medium of claim 9, wherein the processor is further to increase an ink setting time of the printed gloss enhancement image by using one or multiple null disengage cycles.

\* \* \* \* \*